United States Patent [19]
Willey

[11] Patent Number: 5,920,550
[45] Date of Patent: Jul. 6, 1999

[54] SYSTEM, METHOD, AND APPARATUS FOR SOFT HANDOFF

[75] Inventor: William Daniel Willey, Arlington Heights, Ill.

[73] Assignee: Motorola, Inc., Schaumburg, Ill.

[21] Appl. No.: 08/728,727

[22] Filed: Oct. 11, 1996

[51] Int. Cl.[6] .................................................... H04Q 7/00
[52] U.S. Cl. ........................ 370/332; 455/437; 455/442
[58] Field of Search ................................. 370/331, 332; 455/442, 437, 436, 525; 371/33

[56] References Cited

U.S. PATENT DOCUMENTS 4,479,215  10/1984  Baker .
5,610,595   3/1997  Garrabrant et al. .
5,640,414   6/1997  Blakenly, II et al. .
5,699,367  12/1997  Haartsen .

OTHER PUBLICATIONS

TIA/EIA Interim Standard, Mobile Station–Based Station Compatibility Standard for Dual–Mode Wideband Spread Spectrum Cellular System, TIA/EIA/IS–95–A, May 1995, pp. 6–105 to 6–114.

*Primary Examiner*—Michael Horabik
*Assistant Examiner*—Kevin C. Harper
*Attorney, Agent, or Firm*—Donald C. Kordich; Lalita P. Williams

[57] ABSTRACT

A wireless communication device (100) continues to measure pilot signal strengths while in the System Access State (220) and provides at least one of the current measured pilot signal strengths to the base station in each access probe (210). A base station (102) receives the current information on pilot signal strengths (305; 320) and the system specifies the base stations for soft handoff according to the current measured pilot signal strengths (315; 340).

7 Claims, 3 Drawing Sheets

SYSTEM, METHOD, AND APPARATUS FOR SOFT HANDOFF

FIELD OF THE INVENTION

The present invention relates generally to the field of digital communications, and more particularly to a system, method, and apparatus for soft handoff in a cellular or Personal Communication System (PCS) that employs Code-Division Multiple Access (CDMA). Although the invention is subject to a wide range of applications, it is especially suited for use in cellular radiotelephones and base stations, and will be particularly described in that connection.

BACKGROUND OF THE INVENTION

Interim Standard IS-95-A (IS-95) has been adopted by the Telecommunications Industry Association for implementing CDMA in a cellular system. In the CDMA system, a mobile station communicates with any one or more of a plurality of base stations dispersed in a geographic region. Each base station continuously transmits a pilot channel signal having the same spreading code but with a different code phase offset. Phase offset allows the pilot signals to be distinguished from one another, which in turn allows the base stations to be distinguished. Hereinafter, a pilot signal of a base station will be simply referred to as a pilot. The mobile station monitors the pilots and measures the received energy of the pilots.

IS-95 defines a number of states and channels for communication between the mobile station and the base station.

For example, in the Mobile Station Control on the Traffic State, the base station communicates with the mobile station over a Forward Traffic Channel, and the mobile station communicates with the base station over a Reverse Traffic Channel. During a call, the mobile station must constantly monitor and maintain four sets of pilots collectively referred to as the Pilot Set—the Active Set, the Candidate Set, the Neighbor Set, and the Remaining Set. The Active Set are pilots associated with the Forward Traffic Channel assigned to the mobile station The Candidate Set are pilots that are not currently in the Active Set but have been received by a particular mobile station with sufficient strength to indicate that the associated Forward Traffic Channel could be successfully demodulated. The Neighbor Set are pilots that are not currently in the Active Set or Candidate Set but are likely candidates for handoff. The Remaining Set are all possible pilots in the current system on the current CDMA frequency assignment, excluding the pilots in the Neighbor Set, the Candidate Set, and the Active Set.

The mobile station constantly searches a Pilot Channel of neighboring base stations for a pilot that is sufficiently stronger than a threshold value. As the mobile station moves from the region covered by one base station to another, the mobile station promotes certain pilots from the Neighbor Set to the Candidate Set, and notifies the base station or base stations of the promotion from the Neighbor Set to the Candidate Set via a Pilot Strength Measurement Message. The base station determines an Active Set according to the Pilot Strength Measurement Message, and notifies the mobile station of the new Active Set via a Handoff Direction Message. When the mobile station commences communication with a new base station in the new Active Set before terminating communications with the old base station, a "soft handoff" has occurred.

In the Mobile Station Idle State, the mobile station monitors a Paging Channel, transmitted from a single base station of the Active Set for control information and pages. Furthermore, the mobile station continues to search the Pilot Channel of neighboring base stations for a pilot that is sufficiently stronger than the pilot of the currently monitored base station. When a pilot is found to be sufficiently stronger, an "idle handoff" to the neighboring base station having the stronger pilot will occur, and mobile station will then monitor the Paging Channel from this base station.

In a System Access State, the mobile station continues to receive control information over the Paging Channel, and also transmits short signaling messages, such as, call originations, responses to pages, and registrations, over an Access Channel to the monitored base station. While in the System Access State, the mobile station continues its pilot search and updates its Neighbor Set, but, pursuant section 6.6.3.1.3 of IS-95, and in contrast to the Mobile Station Control on the Traffic State and Mobile Station Idle State, the mobile station is not permitted to handoff to another base station.

Whenever the mobile station sends a message in the System Access State, it must make an "access attempt" to the single base station it is monitoring. An access attempt is the process of repeatedly transmitting the message until receiving an acknowledgment for the message from the base station. Each transmission in the access attempt is called an "access probe," which is composed of an Access Channel Preamble and an Access Channel Message. The contents of the an Access Channel Message depends on the type of signaling message. According to section 6.6.3.1.1.1 of IS-95, the same message is sent in each access probe.

IS-95 specifies a particular protocol whenever the mobile station originates a call or responds to a page in the System Access State and sets up for the call in the Mobile Station Control on the Traffic State. Only certain parts of the protocol are discussed herein.

The mobile station first sends an Origination Message over the Access Channel. Upon successful receipt of the Origination Message, the base station sends a Channel Assignment Message over the Paging Channel. The Channel Assignment Message specifies a Traffic Code Channel of the monitored base station for demodulation by the mobile station. The mobile station tunes to the specified Traffic Code Channel, and receives the Forward Traffic Channel. The base station acquires the mobile station on the Reverse Traffic Channel. The mobile station sends, over the Reverse Traffic Channel, the Pilot Strength Measurement Message indicating the current Candidate Set. The base station transmits, over the Forward Traffic Channel, an Extended Handoff Direction Message to the mobile station specifying the Active Set. When the Extended Handoff Direction Message specifies the single, monitored base station and other base stations, a soft handoff is made to the different base stations, and the call is demodulated from the Traffic Code Channels of the base stations represented by the pilots of the Active Set.

Dropped calls and poor call quality reception has been observed using this protocol. This results from the mobile station communicating with only one base station over the Traffic Channel until the soft handoff is made.

As an alleged remedy this problem, a proposed modification to IS-95 would more quickly move the mobile station into soft handoff by reporting pilot signal strengths and specifying certain members of the Candidate Set over the Access Channel rather than waiting until a Traffic Channel is acquired. That is, the mobile station would measure pilot strengths and add to the initial Access Channel Message the identities of base stations that are suitable for a soft handoff.

The base station would include the Active Set in the Channel Assignment Message. Consequently, the mobile station will know its Active Set before acquiring the Traffic Channel, and can immediately acquire the Traffic Channel from multiple base stations rather than one.

This proposed solution has a problem when multiple access probes are required to make a successful access attempt and conditions change. The time between successive access probes is in the order of hundreds of milliseconds. During this time the pilot strengths may change. But, because the same message is sent in each access probe, the same pilot strength measurement that is reported by the mobile station in the initial access probe is reported in subsequent access probes. Because the base station receives outdated pilot strength measurement information in the subsequent access probes, it may not specify the best base stations suitable for handoff in the Active Set. Consequently poor call quality or dropped calls ensue.

A need therefore exists for a system, method, and apparatus for soft handoff that provides current information on pilot signal strengths to the base station.

DESCRIPTION OF THE PREFERRED EMOBIDIMENTS

The system, method, and apparatus described herein performs soft handoff by providing current information on pilot signal strengths to a base station. According to the invention, a mobile station continues to measure pilot signal strengths while in the System Access State and provides the current measured pilot signal strengths to the base station in each access probe. The base station receives the current information on pilot signal strengths and the system specifies the base stations for soft handoff according to the current measured pilot signal strengths.

The invention provides an advantage over the conventional system, method, and apparatus in that dropped calls are reduced and call quality is increased. Additional advantages and novel features of the invention will be set forth in part in the description which follows, wherein embodiments of the invention are shown and described, and in part become apparent to those skilled in the art upon examination of the following detailed description or may be learned by practice of the invention.

Reference will now be made in detail to an embodiment configured according to the present invention.

Figure 1:
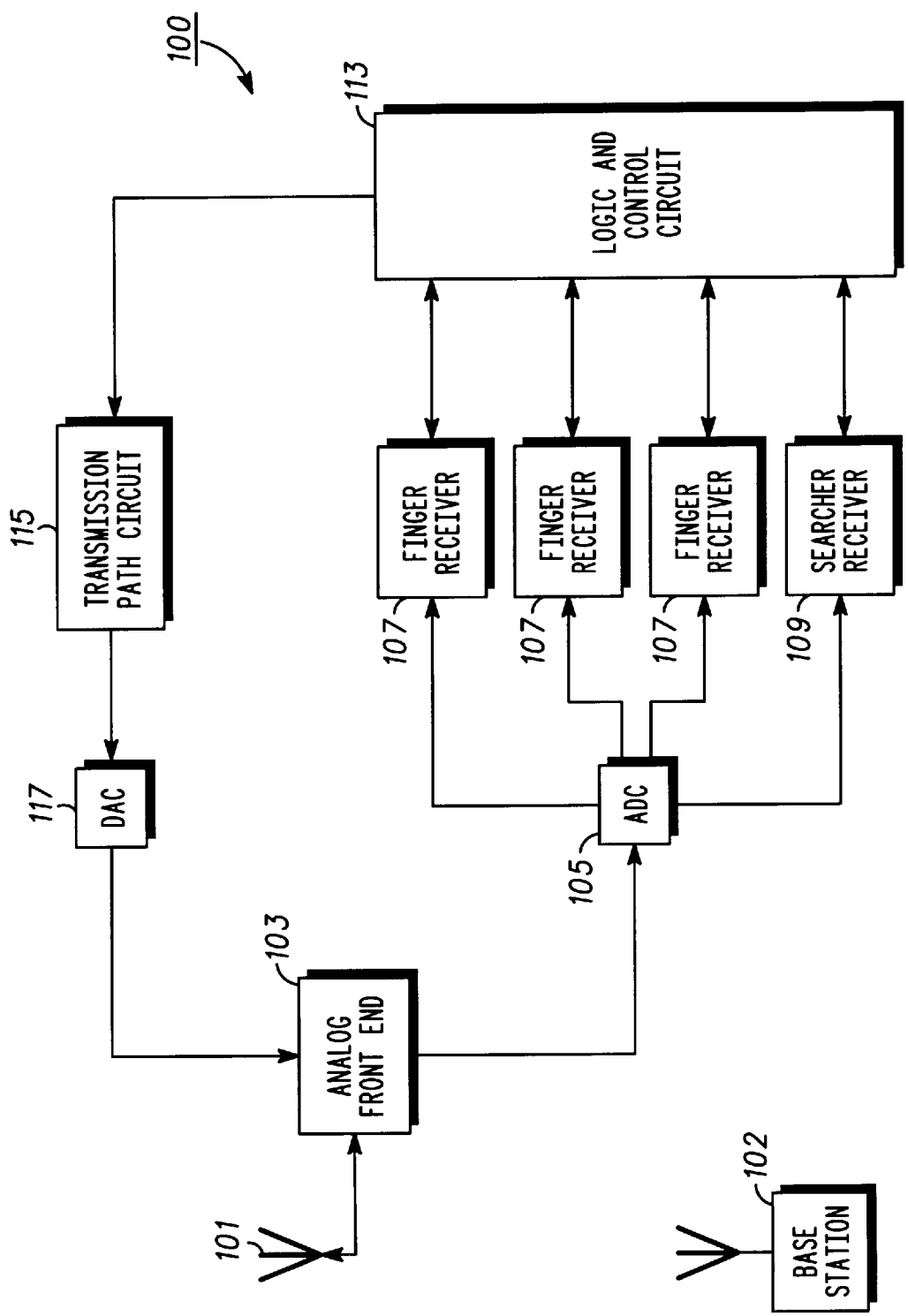
FIG. 1 is an electrical block diagram of a wireless communication system, including a block diagram of a radiotelephone.

FIG. 1 is a an electrical block diagram of a wireless communication system, including a block diagram of a wireless communication device, e.g., a radiotelephone 100. This figure illustrates, among other things, an antenna 101 for receiving signals from a plurality of base stations 102 (only one shown) and transmitting signals originated by radiotelephone 100. An analog front end 103 processes the received signals and provides them to an analog-to-digital converter (ADC) 105. The digitized received signals are provided to a rake receiver comprised of a plurality of finger receivers 107 and at least one searcher receiver 109 connected in parallel. The operation of the finger receivers and search receiver is controlled in part by a logic and control circuit 113. The output of the finger receivers and search receiver is provided to the logic and control circuit 113 for further processing.

Logic and control circuit 113 is capable of storing the data and the software program specifying the instructions for executing the method according to the invention, and storing a record of the Active Set, the Neighbor Set, and the Candidate Set. Logic and control circuit 113 provides data to transmission circuit path 115, which processes the data and provides the processed data to a digital to analog circuit (DAC) 117. The analog signal output by DAC 117 is provided to analog front end 103 for transmission to base stations 102 via antenna 101. An example of the rake receiver and transmission circuit path 115 is the Mobile Station Modem available from Qualcomm, Inc.

Although logic and control circuit 113 is shown as a separate element from the receivers, one of ordinary skill will recognize that portions of the logic and control circuit may reside in the rake receiver or in other elements of the radiotelephone.

Each of the base stations 102 has a similar structure as the radiotelephone 100 for each of the Paging/Access Channel, the Traffic Channel, a Synchronization Channel, and the Pilot Channel (except a reception path is not necessary for the Synchronization Channel and the Pilot Channel), and may also have multiple receive paths and antennas for diversity of reception.

One of ordinary skill in the art will recognize that the communication system requires other infrastructure equipment, which is not shown, for switching, call routing, and other functions.

The method of use and operation of the wireless communication device, as constructed and described above, will now be described with reference to FIG. 2, which is a flow chart illustrating a method 200 of reporting pilot signal strengths.

In the System Access State, searcher receiver 109 initially measures the pilot strength of neighboring pilots. (Step 205.) Logic and control circuit 113 creates an Access Channel Message that includes the initially measured pilot strengths. (Step 210.) Analog front end 103 transmits the Access Channel Message with the initially measured pilot strengths when it performs the first access probe. (Step 215.)

The steps of measuring the pilot signal strengths, (step 220), creating an Access Channel Message that includes the most recent measured pilot strengths, (step 210), and transmitting the Access Channel Message in subsequent access probes are repeated until the radiotelephone receives from the base station an acknowledgment of receipt of the Access Channel Message within a first predetermined time duration, (step 225), or a maximum number of access probes have been transmitted, (step 230).

Reporting the current measured pilot strengths in subsequent access probes is an important feature of the invention, because the system will have current information on the pilot strength measurements for use in determining the base stations for soft handoff.

Figure 2:
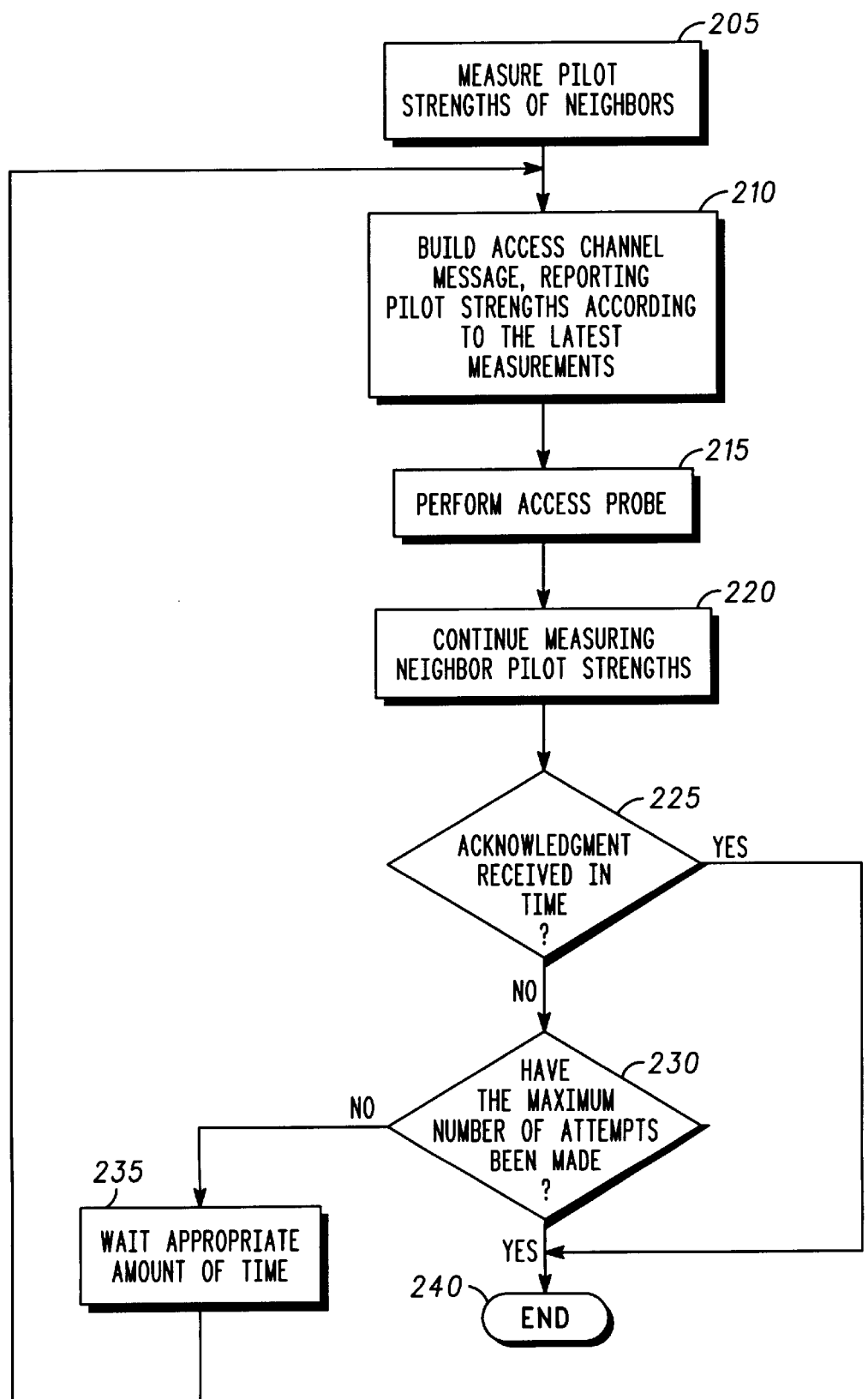
FIG. 2 is a flow chart illustrating a method of reporting pilot signal strengths employed by the radiotelephone shown in FIG. 1.

Referring to FIG. 2, logic and control circuit 113 determines if the acknowledgment of receipt of the Access Channel is received within a first predetermined time duration. (Step 225.) When it has, the method terminates. (Step 240.) When it has not, logic and control circuit 113 determines if a predetermined maximum number of transmissions of the Access Channel Message have been executed. (Step 230.) If so, the method terminates. (Step 240.) If not, logic and control circuit 1 13 waits a second predetermined time duration, (step 235), before creating the next Access Channel Message that includes the recent measured pilot strengths. (Step 210.)

The method of use and operation of the infrastructure, as constructed and described above, will now be described with reference to FIG. 3, which is a flow chart illustrating a method 300 of specifying base stations suitable for handoff.

Figure 3:
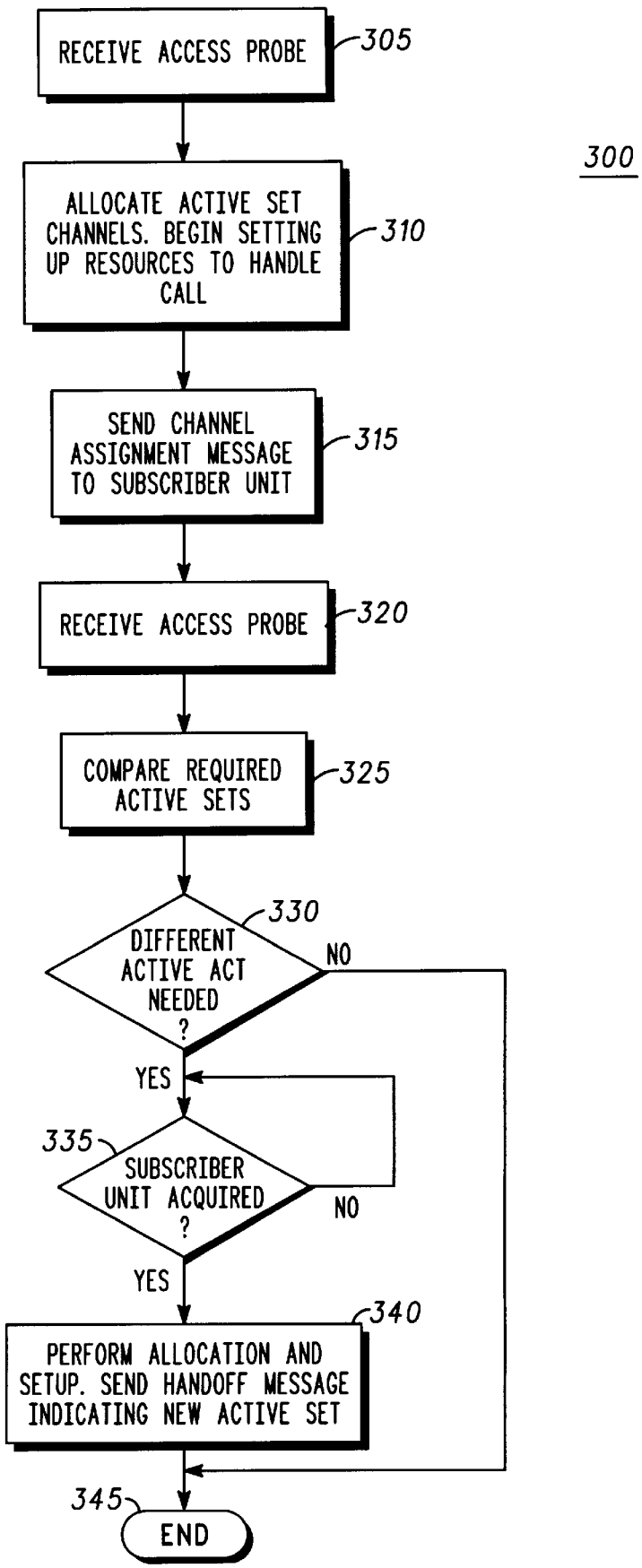
FIG. 3 is a flow chart illustrating a method of specifying base stations suitable for handoff.

Referring now to FIG. 3 and to the structure of the infrastructure and the base station, the analog front end eventually successfully receives a first one of the access probes and thus the Access Channel Message, (step 305), which will be referred to as the first Access Channel Message. The infrastructure begins to allocate the Active Set channels, by creating a first Active Set according to the first set of measured pilot strengths, and begins setting up resources to handle the call. (Step 310.) Base station 102 sends the acknowledgment of receipt of the Access Channel Message and a Channel Assignment Message that specifies the first Active Set. (Step 315.)

In some situations, e.g., when there are forward link errors on the Paging Channel, radiotelephone 100 may transmit another access probe before it receives the acknowledgment of receipt of the Access Channel Message. Accordingly, base station 102 will receive another Access Channel Message, (step 320), referred to as the second Access Channel Message, which specifies more current pilot strength measurements than those in the first Access Channel Message. The infrastructure determines if it needs to specify a new Active Set that is different the first Active Set based on the more current measurements. For example, the infrastructure creates a second Active Set according to the second set of measured pilot strengths, compares the first Active Set and the second Active Set, (step 325), and determines if the first Active Set and the second Active Set are different, (step 330). The first Active Set and the second Active Set are different, e.g., when they specify one or possibly more different pilots in their respective set of pilots.

When a different Active Set is not necessary, the method ends. (Step 345.) When a different Active Set is necessary, the base station waits until the subscriber unit is acquired on the Reverse Traffic Channel. (Step 335.) The infrastructure allocates the Active Set channels, by creating a second Active Set according to the second set of measured pilot strengths, and begins setting up resources to handle the call. (Step 340.) Although shown after step 335, the allocation may commence as soon it is determined that the Active Sets are different.

Furthermore, base station 102 sends, over the Forward Traffic Channel, an Extended Handoff Message specifying the second Active Set. (Step 340.) The mobile station can then perform a soft handoff to the pilots of the second Active Set.

In summary, an embodiment configured in accordance with the present invention provides for soft handoff in a wireless communication system employing CDMA by providing current information on pilot signal strengths to the base station in each access probe, and sending to the wireless communication device an Active Set derived from the current pilot signal strengths.

What is claimed is:

1. A method of handoff comprising the steps of:
   a) measuring a pilot strength of at least one neighboring pilot to yield at least one measured pilot strength;
   b) creating an Access Channel Message that includes the at least one measured pilot strength;
   c) transmitting an access probe containing the Access Channel Message;
   d) repeating steps a) through c) until an acknowledgment of receipt of the Access Channel Message is received; and
   e) receiving an Active Set determined according to the at least one measured pilot strength.

2. The method of claim 1 further comprising the steps of:
   determining, after each execution of step c), if the acknowledgment of receipt of the Access Channel Message is received within a first predetermined time duration;
   determining if a predetermined maximum number of transmissions of the Access Channel Message have been executed when the acknowledgment of receipt of the Access Channel Message is not received within the first predetermined time duration; and
   waiting a second predetermined time duration before executing step b) when the predetermined maximum number of transmissions of the Access Channel Message have not been executed.

3. A wireless communication device for use in a wireless communication system, the wireless communication system including a base station for transmitting an acknowledgment of a receipt of an Access Channel Message and for transmitting an Active Set, the wireless communication device comprising:
   a searcher receiver for measuring a pilot strength of at least one neighboring pilot and yielding at least one measured pilot strength;
   a logic and control circuit for creating an Access Channel Message that includes the at least one measured pilot strength; and
   an analog front end for transmitting an access probe containing the Access Channel Message;
   wherein the measurement of the pilot strength of the at least one neighboring pilot, the creation of the Access Channel Message that includes the at least one measured pilot strength, and the transmission of the Access Channel Message is repeated until the logic and control circuit receives the acknowledgment of the receipt of the Access Channel Message;
   the analog front end further receives the Active Set determined according to the at least one measured pilot strength.

4. The wireless communication device of claim 3 wherein:
   the logic and control circuit further determines if the acknowledgment of receipt of the Access Channel Message is received within a first predetermined time duration after the transmission of the Access Channel Message, determines if a predetermined maximum number of transmissions of the Access Channel Message have been executed when the acknowledgment of receipt of the Access Channel Message is not received within the first predetermined time duration, and waits a second predetermined time duration before creating the Access Channel Message when the predetermined maximum number of transmissions of the Access Channel Message have not been executed.

5. A method of handoff comprising the steps of:
   receiving a first access probe containing a first Access Channel Message that includes a first set of measured pilot strengths;

creating a first Active Set according to the first set of measured pilot strengths;

receiving a second access probe containing a second Access Channel Message that includes a second set of measured pilot strengths;

creating a second Active Set according to the second set of measured pilot strengths;

determining if the first Active Set and the second Active Set are different; and transmitting the second Active Set when the first Active Set and the second Active Set are different.

6. A base station for use in a wireless communication system, the wireless communication system including a wireless communication device for repeatedly transmitting an Access Channel Message that includes measured pilot strengths, the base station comprising:

an analog front end for receiving a first access probe containing a first Access Channel Message that includes a first set of measured pilot strengths and for receiving a second access probe containing a second Access Channel Message that includes a second set of measured pilot strengths; and a logic and control circuit for creating a first Active Set according to the first set of measured pilot strengths and creating a second Active Set according to the second set of measured pilot strengths, and for determining if the first Active Set and the second Active Set are different;

the analog front end transmitting the second Active Set when the first Active Set and the second Active Set are different.

7. A method of handoff in a wireless communication system comprising the steps of:

measuring a pilot strength of at least one neighboring pilot and yielding at least one measured pilot strength;

creating a first Access Channel Message that includes the at least one measured pilot strength;

transmitting an access probe containing the first Access Channel Message;

receiving the first Access Channel Message;

transmitting an acknowledgment of receipt of the first Access Channel Message;

creating a first Active Set according to the at least one of the measured pilot strengths;

transmitting the first Active Set;

again measuring the pilot strength of at least one neighboring pilot to yield a second at least one measured pilot strength;

creating a second Access Channel Message that includes the second at least one measured pilot strength;

transmitting another access probe containing the second Access Channel Message;

receiving the second Access Channel Message;

creating a second Active Set according to the at least one of the again measured pilot strengths;

determining if the first Active Set and the second Active Set are different; and transmitting the second Active Set when the first Active Set and the second Active Set are different.

* * * * *